United States Patent
Nguyen et al.

(10) Patent No.: US 6,298,772 B1
(45) Date of Patent: Oct. 9, 2001

(54) TOASTER

(75) Inventors: Nhiem Viet Nguyen; John J. Datovech, both of Glen Allen, VA (US)

(73) Assignee: Hamilton Beach/Proctor-Silex, Inc., Glen Allen, VA (US)

( * ) Notice: Subject to any disclaimer, the term of this patent is extended or adjusted under 35 U.S.C. 154(b) by 0 days.

(21) Appl. No.: 09/826,471

(22) Filed: Apr. 5, 2001

(51) Int. Cl.[7] .............................. A47J 37/08; H05B 1/02
(52) U.S. Cl. ...................... 99/327; 99/329 P; 99/329 RT; 99/337; 99/385; 99/389; 99/391; 219/492; 219/521
(58) Field of Search ................ 99/326–333, 337, 99/338, 385, 389–391, 393, 396, 400–402; 219/492, 494, 481, 493, 497, 505, 506, 491, 521, 525, 518, 519, 411, 413; 426/241, 243, 466, 523; 392/373, 375, 337, 407

(56) References Cited

U.S. PATENT DOCUMENTS

| | | | |
|---|---|---|---|
| 1,893,989 | * 1/1933 | Galer ................................. 99/390 X |
| 1,926,276 | * 9/1933 | Forbes ................................... 99/332 |
| 1,967,209 | * 7/1934 | Lawrence ............................. 99/327 |
| 1,979,845 | * 11/1934 | Schallis ................................ 99/332 |
| 2,251,925 | 8/1941 | Edmunds et al. . |
| 2,387,817 | 10/1945 | Wales . |
| 2,553,593 | 5/1951 | Lermont . |
| 2,562,535 | 7/1951 | Leonard . |
| 2,631,523 | * 3/1953 | Olving ............................... 99/331 X |
| 2,877,702 | 3/1959 | Turner . |
| 2,913,976 | 11/1959 | Cole . |
| 3,869,970 | 3/1975 | Eagle . |
| 3,956,978 | * 5/1976 | Borley ............................... 99/329 R |
| 4,188,865 | 2/1980 | Bjarsch . |
| 4,345,513 | * 8/1982 | Holt ................................... 99/401 X |
| 5,018,437 | * 5/1991 | San Juan ................................ 99/327 |
| 5,044,263 | * 9/1991 | Birkert et al. ......................... 99/327 |
| 5,085,136 | 2/1992 | Eisenberg . |
| 5,097,751 | 3/1992 | Eisenberg et al. . |
| 5,304,782 | * 4/1994 | McNair et al. .................. 219/497 X |
| 5,385,082 | 1/1995 | Huggler et al. . |
| 5,653,158 | 8/1997 | Balandier et al. . |
| 5,771,780 | * 6/1998 | Basora et al. ...................... 99/389 X |
| 5,802,957 | * 9/1998 | Wanat et al. ..................... 219/521 X |
| 5,918,532 | 7/1999 | Arnedo et al. . |
| 6,014,925 | * 1/2000 | Basora et al. ......................... 99/327 |
| 6,123,012 | 9/2000 | Hardin et al. . |
| 6,129,007 | 10/2000 | Chan et al. . |

* cited by examiner

Primary Examiner—Timothy F. Simone
(74) Attorney, Agent, or Firm—Akin, Gump, Strauss, Hauer & Feld, L.L.P.

(57) ABSTRACT

A toaster having a ferromagnetic armature movable between an engaged position adjacent to a solenoid and closing a switch and a disengaged position away from the solenoid and opening the switch. A displacement assembly is adapted to move from an up position through a toasting position to a down position, whereupon the displacement assembly displaces the armature from the disengaged position to the engaged position, closing the switch and energizing a heating element and the solenoid, thus retaining the armature in the engaged position. The armature engages the displacement assembly when the armature is in its engaged position to retain the displacement assembly in the intermediate toasting position. A timer de-energizes the solenoid upon completion of toasting, releasing the armature to return to the disengaged position, thus opening the switch and causing de-energization of the heating element independently of the displacement assembly returning to the up position.

12 Claims, 5 Drawing Sheets

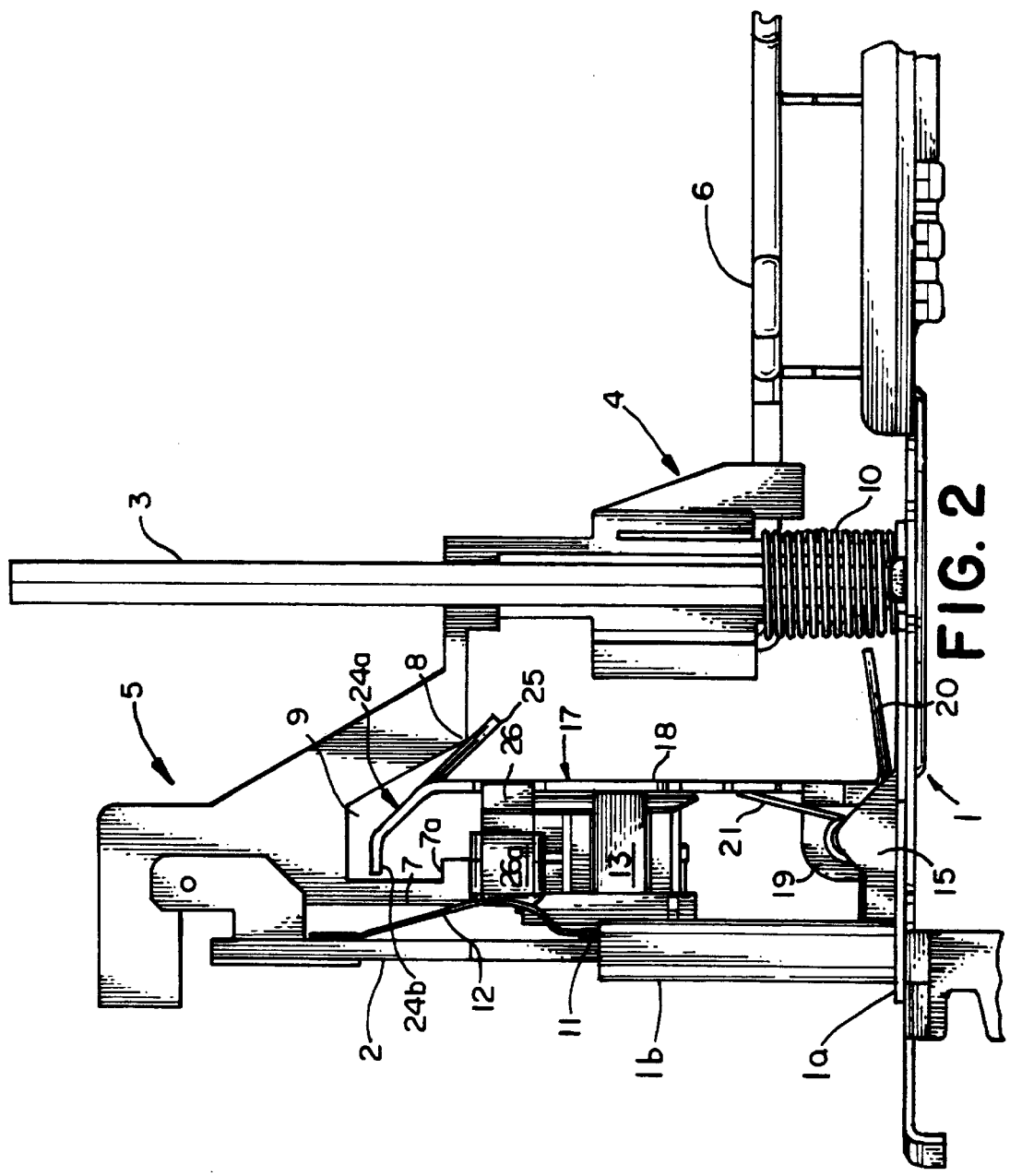

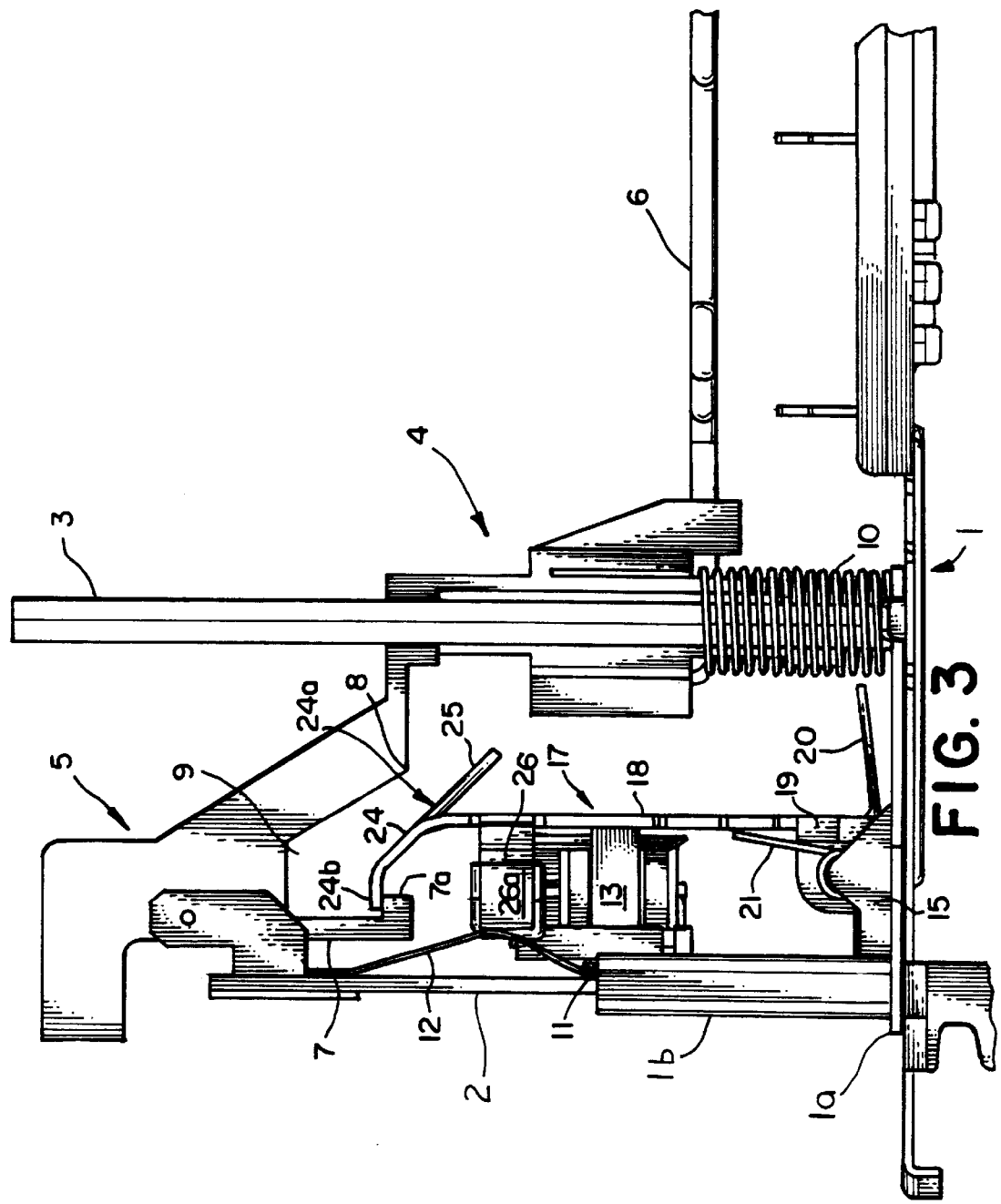

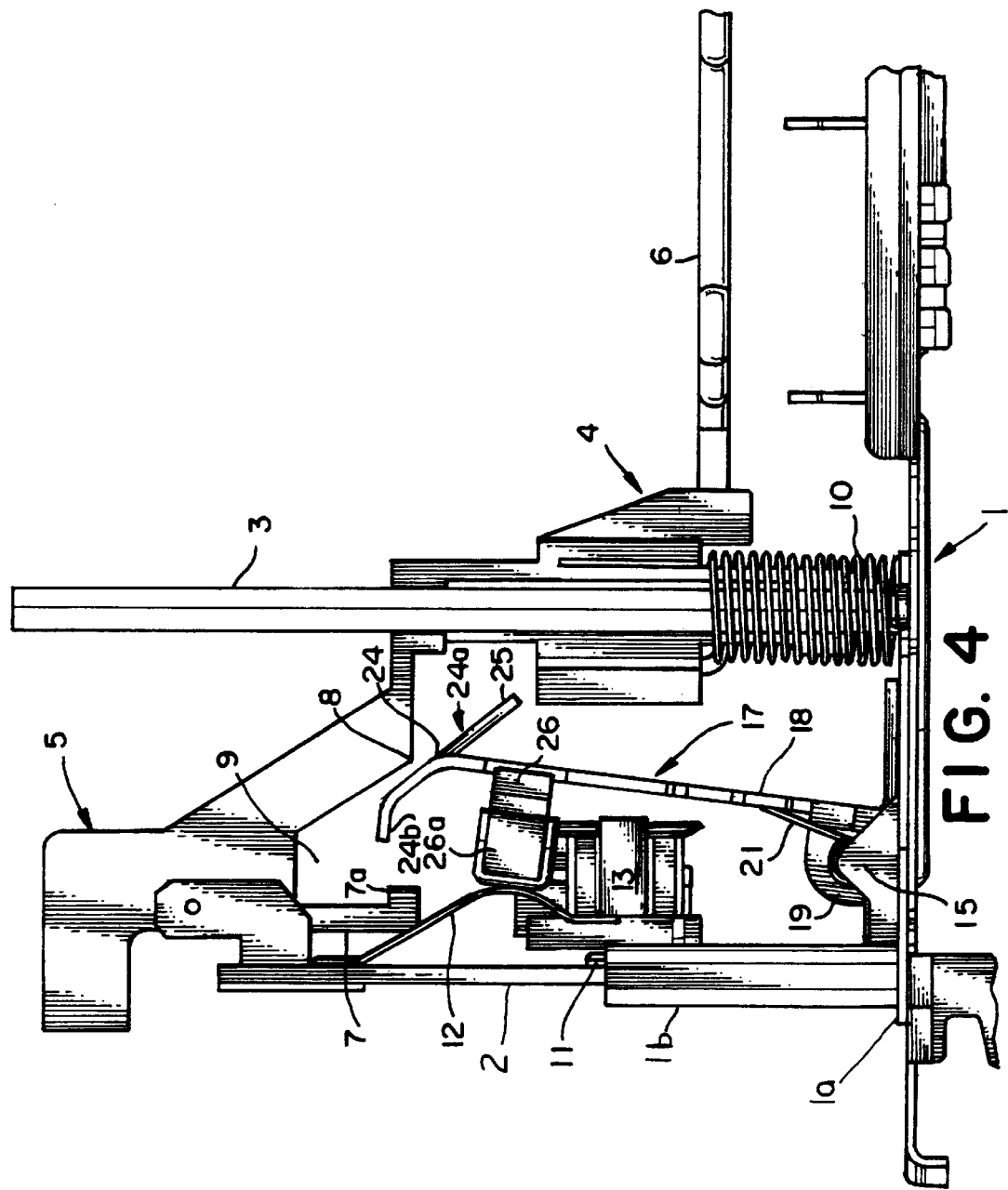

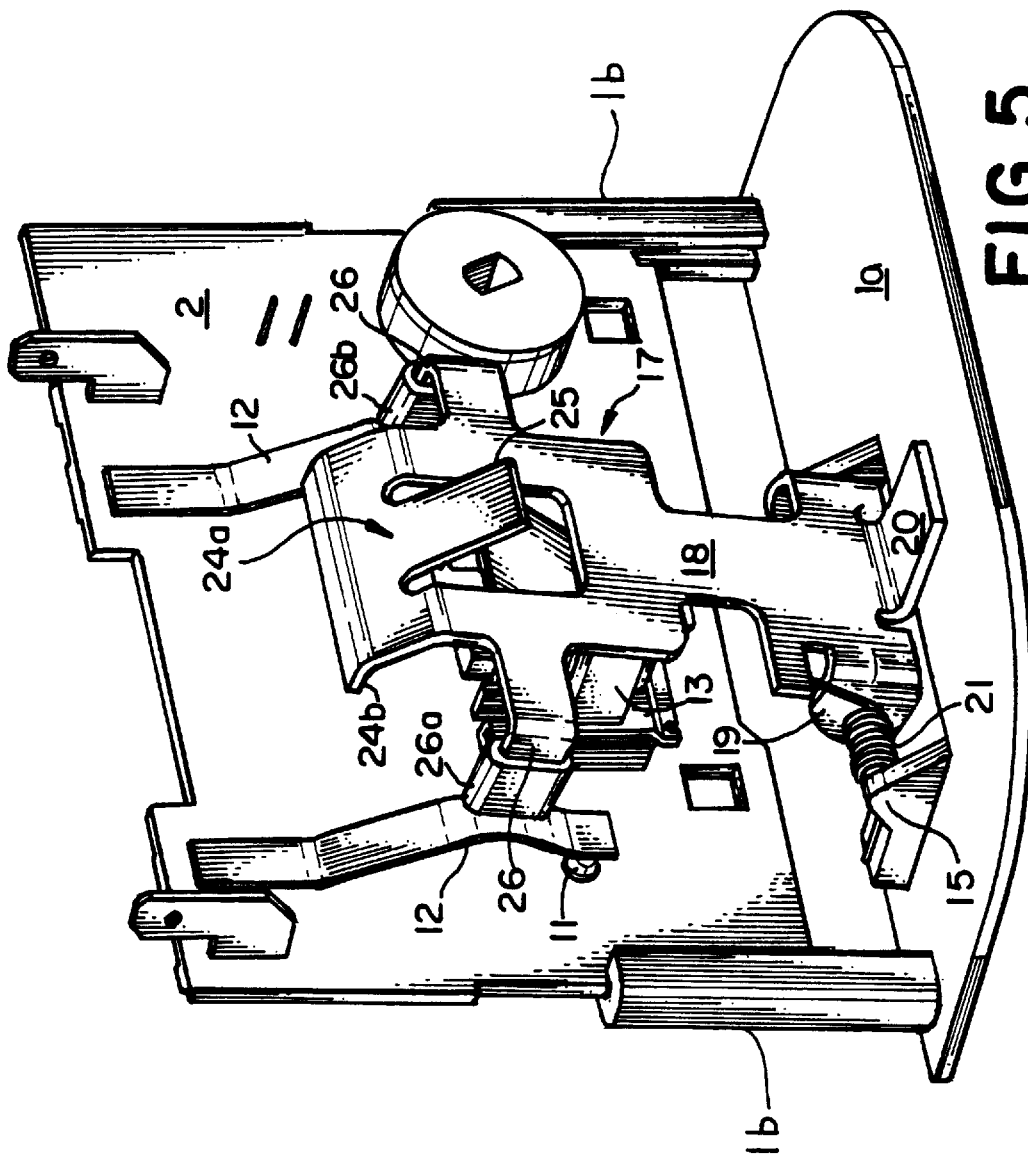

TOASTER

BACKGROUND OF THE INVENTION

The present invention relates generally to electric toasters and more particularly to an electric toaster having an armature that permits electrical power to one or more heating elements to be terminated independently of ejection of a consumable food product.

Given the popularity of toasted, generally planar consumable food products, such as toasted bread or bagels, electric, pop-up toasters are ubiquitous in the modern kitchen. Generally, such toasters include a housing having one or more, and generally two or four, slots therein, each configured to accept a consumable product. Such toasters include a vertically-movable mechanism for supporting the consumable product within a slot, configured for moving the consumable product between an upper position, wherein the consumable product is at least partly extended from the slot so that the user may easily remove the consumable product, and a lower or toasting position, wherein the consumable product is disposed adjacent to electric resistance heating elements for toasting the product.

In operation, a user places a consumable product into a slot and depresses a handle attached to the vertically-movable mechanism and thereby lowers the consumable product to the toasting position. Downward movement of the vertically-movable mechanism closes a switch that energizes the heating elements which toast the consumable product. A timer in the form of, for example, an electronic timer, color sensor, bimetallic element, or the like determines the duration of the toasting cycle. When the toasting cycle is complete, the timer causes the vertically-movable mechanism to be released, whereupon a spring or other biasing element returns the vertically-movable mechanism and consumable product to its upper position for removal and consumption of the toasted product.

One problem that may arise with such traditional electric toasters is that if the consumable product becomes jammed in the slot when the vertically-movable mechanism is in its toasting position, the switch, which generally opens in response to upward movement of the vertically-movable mechanism, is prevented from opening. When this occurs, the heating elements remain energized, causing at a minimum burning or charring of the consumable product, and at worst, creating a substantial risk of fire. The present invention provides a toaster that is not subject to charring or igniting a consumable product as a result of the consumable product becoming jammed in the slot.

BRIEF SUMMARY OF THE INVENTION

Briefly, the present invention is directed to a toaster for toasting generally planar consumable products. The toaster includes a toaster housing defining a toasting slot, a heating element positioned in the slot, and a solenoid positioned on the housing. A switch is positioned on the housing and is connected to a power supply. The switch is also electrically connected to the heating element and the solenoid for energizing and de-energizing the heating element and for energizing the solenoid. A ferromagnetic armature is positioned on the housing, movable between an engaged position adjacent to the solenoid and closing the switch and a disengaged position away from the solenoid and opening the switch. The armature includes a lateral catch extending therefrom and an inclined top surface. A biasing member is positioned on the armature, biasing the armature toward the disengaged position. A displacement assembly includes a bread lifter configured to hold a consumable product within the toasting slot for toasting by the heating element. The displacement assembly is adapted to move from an up position through an intermediate toasting position to a down position and includes a lateral catch receiver for receiving the lateral catch when the armature is in the engaged position to thereby retain the displacement assembly in the intermediate toasting position when the displacement assembly moves from the down position toward the up position. The displacement assembly also includes an armature actuator which engages the inclined top surface of the armature as the displacement assembly moves from the up position to the down position. The interaction of the armature actuator and the inclined top surface causes displacement of the armature from the disengaged position to the engaged position to close the switch and energize the heating element and the solenoid. Energization of the solenoid retains the armature in the engaged position. A resilient member is positioned on the displacement assembly for biasing the displacement assembly toward the up position. A timer is connected to the solenoid for de-energizing the solenoid upon completion of toasting the consumable product and thereby releasing the armature to return to the disengaged position, thus opening the switch and causing de-energization of the heating element independently of the displacement assembly returning to the up position.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 2 is a side elevational view of the toaster of FIG. 1, showing the displacement assembly in a down position;

FIG. 3 is a side elevational view of the toaster of FIG. 1, showing the displacement assembly in an intermediate, heating position;

FIG. 4 is a side elevational view of the toaster of FIG. 1, showing the displacement assembly in the heating position and an armature in a disengaged position; and FIG. 5 is a perspective view of some of the components of the toaster of FIG. 1.

DETAILED DESCRIPTION OF THE INVENTION

Figure 1:
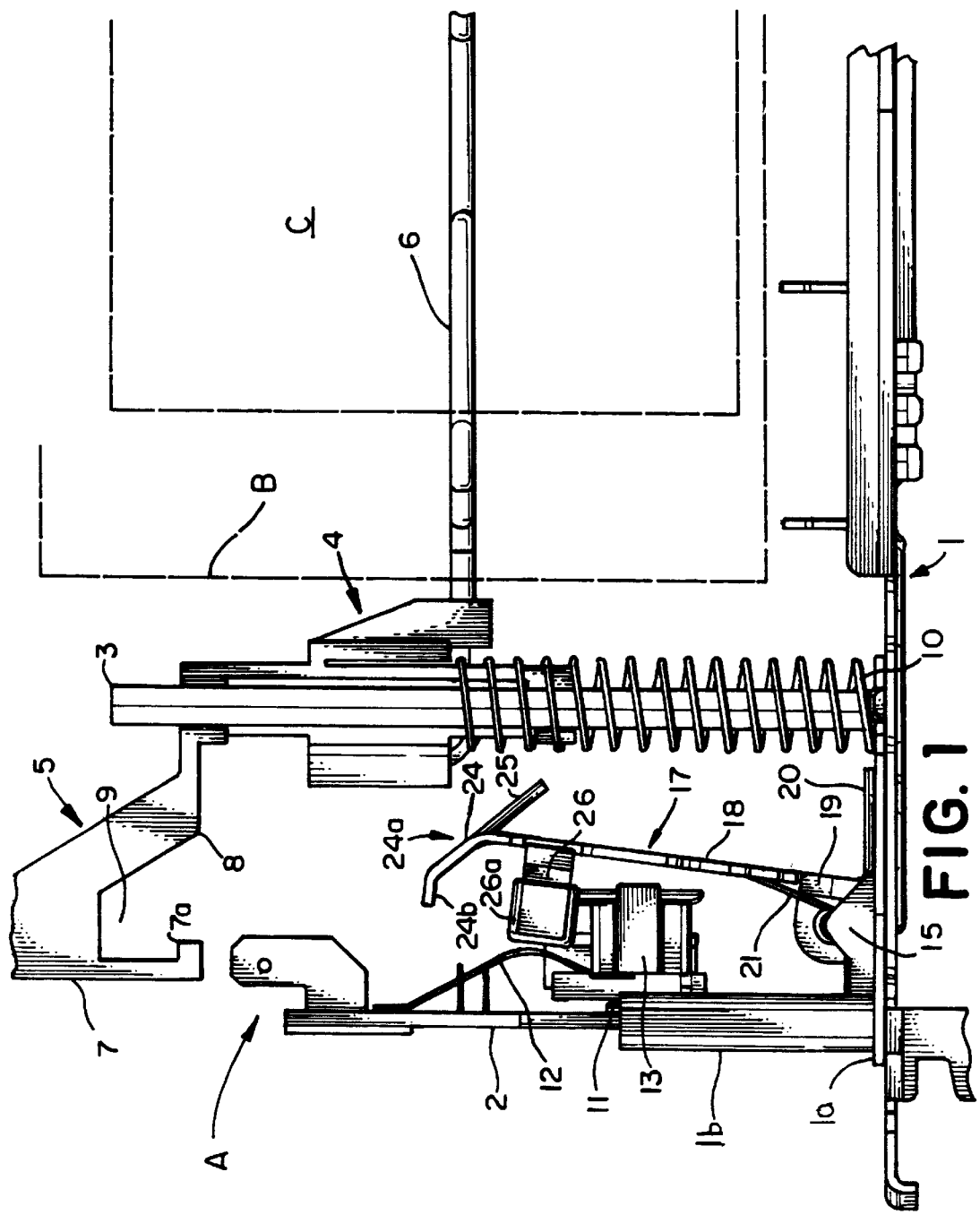
FIG. 1 is a side elevational view of the interior components of a toaster in accordance with a preferred embodiment of the present invention, showing an up position of a displacement assembly.

Referring to the drawings in detail, wherein like numerals indicate like elements throughout, there is shown in FIGS. 1–5 a preferred embodiment of a toaster, generally designated A, in accordance with the present invention. As shown in FIGS. 1–4, the toaster A is a countertop electric toaster for heating or toasting (hereinafter "toasting") vertically oriented, typically, but not necessarily, generally planar consumable products (not shown) such as bread, bagels, or the like. The toaster A includes a base 1 and a wall 2 which extends generally upwardly from the base 1. The wall 2 is preferably a printed circuit board, the function of which will become apparent from the discussion below. Additionally, the base 1 preferably includes a printed circuit board base 1a and a pair of opposed vertical printed circuit board holders 1b. It should be noted that the wall 2 need not be a printed circuit board but may be any other structure that is at least substantially rigid, and the base 1 need not include a printed circuit board base and holders 1b, but may facilitate support of the wall 2 in any one of a multitude of ways well known to those skilled in the art.

In a conventional sense, the toaster housing also defines at least one heating or toasting slot B (shown schematically in FIG. 1) for receiving the consumable products, and one or more heating elements C (shown schematically in FIG. 1), the toasting slot B and heating elements C being arranged such that when the consumable product is within the toasting slot B the heating elements C are positioned to heat or toast the consumable product on one or both lateral sides.

Spaced from the wall 2 and also extending upwardly from the base 1, preferably adjacent to the toasting slot B, is a post 3. A displacement assembly 4 comprising an actuator 5 and a product or bread lifter 6 is slidably positioned on the post 3 such that the displacement assembly 4 can move within a predetermined vertical range. It should be noted that the displacement assembly 4 preferably is a unitary structure with the actuator 5 and bread lifter 6 being fixed to one another so as to prevent only relative movement therebetween. The bread lifter 6 is generally horizontally disposed within the toasting slot B and supports the consumable products in an up position, shown in FIG. 1, a down position, shown in FIG. 2, and an intermediate, heating or toasting position, shown in FIGS. 3 and 4. As shown in FIGS. 1–5, the actuator 5, which is shaped generally like a cup hook with an open side facing downwardly, extends laterally from the post 3 toward the wall 2 of the toaster housing and provides the point of attachment for a handle (not shown) to be used by a user to depress the bread lifter 6 and the supported consumable product downwardly and to initiate the toasting process. The actuator 5 includes a depending actuator hook 7 at its laterally distal end, remote from the post 3, which along with an armature actuator 8, define an actuator recess 9. The function of each of these features will be described below. The depending actuator hook 7 includes a lateral catch receiver 7a, which preferably includes a horizontally-disposed, upwardly-facing surface directed inwardly toward the post 3. It will be recognized by those skilled in the art that the catch receiver 7a need not be configured as described above, but may be virtually any structure that will capture and hold a mating component as described below.

At this point it should be noted that the post 3, actuator 5, and bread lifter 6 preferably are made from a polymeric material capable of withstanding the high temperatures within the toaster A, but alternatively may be made from steel, aluminum, an alloy or other suitable metallic material.

The bread lifter 6, and accordingly the entire displacement assembly 4, are biased toward the up position shown in FIG. 1 by a resilient member or coil spring 10 positioned on the post 3 between the base 1 and the displacement assembly 4. Preferably the post 3 and coil spring 10 are configured such that the post 3 extends through the longitudinal center of the coil spring 10. It will be recognized by those skilled in the art that the particular configuration of the spring 10 is not significant to the present invention inasmuch as virtually any mechanism for biasing the displacement assembly 4 toward the up position may be utilized.

As best shown in FIG. 5, a pair of electrical pin conductors 11 (only one shown) are fixedly mounted on the wall 2. Two spring contacts 12 are fixed, preferably at their upper ends, to the wall 2 such that their lower ends are positioned for movement into contact with the pin conductors 11 to complete an electrical circuit to provide power to the heating elements C. The lower ends of the spring contacts 12 are biased to a position where the spring contacts 12 are spaced from the pin conductors 11, the combination of the pin conductors 11 and the spring contacts 12 forming a normally open contact switch. In the preferred embodiment, the pin conductors 11 are electrically connected to one or more electric resistance heating elements C, whereas the spring contacts 12 are electrically connected to an electrical power source (not shown). However, it will be recognized by those skilled in the art that the spring contacts 12 could be connected to the heating elements C and the pin contacts 11 could be connected to the electrical power source without departing from the present invention. It should also be noted that there may be more or fewer than a pair of pin conductors 11 and spring contacts 12, depending on the amount of current drawn by the heating elements C, the material used for, and the size of, the pin conductors 11 and spring contacts 12, and other variables well known to those skilled in the art. It should also be appreciated that some other switch structure could alternatively be employed.

Fixed to the wall 2 and preferably positioned generally between the pair of pin conductors 11 is a solenoid or electromagnet 13 of conventional design which receives power from an electrical power source when the spring contacts 12 make electrical contact with the pin conductors 11. The function of the solenoid 13 will become apparent from the discussion below.

Referring again to FIGS. 1–5, a pair of armature mount brackets 15 are positioned on the interior surface of the base 1, preferably adjacent to the wall 2. As best shown in FIG. 5, an armature pivot pin 16 extends between the armature mount brackets 15. An armature 17, the function of which is to force the spring contacts 12 into contact with the contact pins 11, is pivotally mounted on the armature pivot pin 16 and extends generally upwardly in a region between the wall 2 and the post 3. The armature 17 includes a generally upright body 18, the lower end of which includes a pair of spaced apart legs 19 extending toward the wall 2. Each leg 19 has a hole (not shown) therethrough for receiving the armature pivot pin 16, thereby providing a pivot axis about which the armature 17 pivots. The armature 17 pivots from a disengaged position (shown in FIG. 1) where the armature 17 is canted away from the wall 2 and solenoid 13 and permits the spring contacts 12 to move out of electrical contact with the contact pins 11, to an engaged position (shown in FIG. 2) where the armature 17 is generally perpendicular to the base 1 and adjacent to the solenoid 13, wherein the spring contacts 12 are brought into electrical contact with the contact pins 11. To limit the extent to which the armature 17 may cant away from the wall 2, the lower end of the armature 17 includes a tail 20, positioned proximate the base 1 and extending away from the wall 2, generally opposite the extending direction of the legs 19. The tail 20 extends away from the armature 17 at an acute angle relative to the body 18 such that when the tail 20 is in contact with the base 1 the armature 17 is canted away from the wall 2 in its first position as shown in FIG. 1. It should be noted at this point that the armature 17 is biased to its first position, where the tail 20 is in contact with the base 1 and the armature 17 is canted away from the wall 17, by a biasing member or coil spring 21 positioned on the pivot pin 16. The coil spring 21 includes first and second fingers 22, 23 for engaging the base 1 and armature 17, respectively.

It is contemplated that the armature 17 need not be a pivoting structure as shown in the figures but may be an alternative form of structure movable toward and away from the solenoid 13. As an example of such an alternative structure, the armature 17 may be a laterally-movable structure (not shown) that slides toward and away from the solenoid 13 on a structure directly or indirectly mounted on the base 1 or wall 2.

As shown in FIGS. 1–5, the armature 17 further includes a head 24 which extends generally upwardly and laterally from the body 18 of the armature 17 and toward the wall 2. More specifically, the head 24 includes an inclined top surface 24a and a lateral catch 24b. The inclined top surface 24a preferably is integral with the body 18 of the armature 17 and extends toward the wall 21 at an angle which preferably is upwardly-inclined as the head 24 extends toward the wall 2. The lateral catch 24b preferably is integral with the inclined top surface 24a and extends generally horizontally (when the armature 17 is in the engaged position shown in FIGS. 2 and 3) toward the wall 2. In the preferred embodiment, the head 24 also includes a tab 25, the upper surface of which forms a portion of the inclined top surface 24a. It should be understood at this point that the tab 25 and inclined portion 24a co-act to form a ramp, the function of which will be discussed below.

The actuator 17 also includes a pair of arms 26 which preferably are integral with the body 18 and extend laterally from the body 18 toward the wall 2, in alignment with the lower portions of the spring contacts 12. The arms 26 include a first end attached to the armature 17 and a second end for engaging the switch, i.e., spring contacts 12 and connector pins 11. The arms 26 are configured such that when the armature 5 is in its first position as shown in FIG. 1, wherein the armature 17 is canted away from the wall 2, the arms 26 are not in contact with the spring contacts 12. The arms 26 are further configured such that when the armature 17 is in its engaged position, as shown in FIG. 2, where the armature 17 is generally perpendicular to the base 1, the second end of each of the arms 26 are in contact with the spring contacts 12 and retain the spring contacts 12 in electrical contacting engagement with the pin conductors 11. The second end of each of the arms 26 preferably is fitted with an insulating boot 26a that covers the second end of each arm 26, thereby electrically insulating the spring contacts 12 from the armature 17. For reasons that will become clear from the discussion below, the armature 17 preferably is made from a ferromagnetic material. Although preferably the armature 17 is constructed entirely from a ferromagnetic material, it is contemplated that a ferromagnetic armature 17, as that term is used herein, may be made predominantly of another, non-ferromagnetic material, with only a portion of the armature 17 being made from a ferromagnetic material. Additionally, while in the preferred embodiment the armature 17 is provided with arms 26 that extend from the body 18, those skilled in the art will recognize that any physical structure may be integrated with or attached to the armature 17 for contacting the spring contacts 12 to close the switch that powers the heating elements C. Indeed, the spring contacts 12 and/or connector pins 11 and armature 17 could be configured such that the armature 17 itself closes the switch. Thus, it will be recognized by those skilled in the art from reading this disclosure that the critical feature is that the armature 17 operate to cause electrical engagement between the spring contacts 12 and connector pins 11.

The operation of the toaster A can be discerned from viewing FIGS. 1 through 4 in numerical sequential order. Referring to FIG. 1, the bread lifter 6 is in its up position to receive a consumable product which is inserted into the toaster A by the user. The user then depresses a handle (not shown) which is attached to the distal end of the actuator 5 and, inasmuch as the actuator 5 and bread lifter 6 preferably are an integral assembly such that there is no relative movement therebetween, depression of the handle and actuator 5 also causes a like depression of the bread lifter 6 against the biasing force of the resilient member or coil spring 10. As shown in FIG. 2, as the actuator 5 moves downwardly, the armature actuator 8 engages the inclined portion 24a of the head 24, sliding downwardly along the inclined portion 24a. The interaction between the armature actuator 8 and the inclined portion 24a causes the armature 17 to move from its disengaged position as shown in FIG. 1, to its engaged position as shown in FIG. 2, the actuator recess 9 providing clearance for the head 24 of the armature 17. Movement of the armature 17 from its disengaged position to its engaged position causes the arms 26 to engage the spring contacts 12 which in turn causes the spring contacts 12 to come into electrical conducting engagement with the pin conductors 11. The operative electrical connection of the spring contacts 12 and pin conductors 1 completes an electrical circuit (not shown) that energizes the solenoid 13 and the heating element C, thus causing the consumable product to be heated or toasted. The activation of the solenoid 13 also causes the armature 17, which is formed from ferromagnetic material, to be maintained in contact with the solenoid 13. Energizing the electrical circuit also initiates electronic timer circuitry (not shown), which limits the duration of activation of the solenoid 13 and heating element(s) C. It is contemplated that the duration of activation of the solenoid 13 and heating element(s) C need not necessarily be limited or controlled by a timer of electronic design, but could be controlled by any of a number of interchangeable timers, such as a color sensor (not shown), a thermal timer (i.e., bimetallic element device) (not shown), or as stated above, an electronic timer. Those of ordinary skill in the art will recognize the interchangeability of these timers for accomplishing the described control of the toasting function.

Once the handle is fully depressed, the user releases the handle, permitting the upwardly biasing force of the coil spring 10 to cause the actuator 5, and accordingly the bread lifter 6, to return to an intermediate toasting position as shown in FIG. 3, where the actuator hook 7, and more specifically the lateral catch receiver 7a, engages the lateral catch 24b of the head 24 of the armature 17, preventing further elevation of the bread lifter 6. The bread lifter 6 is thereby maintained in a position which exposes the consumable product to the energized heating element(s) C. As can be seen by comparing FIG. 2 to FIG. 3, the actuator 5 rises such that the armature actuator 8 is no longer in contact with the inclined portion 24a of the armature 17, thus creating clearance for the armature 17 to return to its disengaged position, described above.

In normal operation, once the consumable product is toasted, the timer, which is electrically operationally connected to the solenoid 13 for de-energizing the solenoid 13 upon completion of the toasting cycle, opens the electrical circuit, thus de-energizing the solenoid 13, permitting the coil spring 21 to cause the armature 17 to return to its disengaged position, canted away from the wall 2 and solenoid 13, as shown in FIG. 4, thereby de-energizing the heating element(s) C by release of the spring contacts 12. Return of the armature 17 to its disengaged position also disengages the lateral catch 24b of the head 24 from the lateral catch receiver 7a of the actuator hook 7, permitting the upwardly biasing force of the coil spring 10 to lift the bread lifter 6, and accordingly, the actuator 5, to the up position where the user can remove the consumable product.

It is an important feature of the present invention that when the toasting cycle is complete, if the consumable product is misaligned or otherwise jammed and does not permit the bread lifter 6 to rise to the up position, the electric heating element(s) C is nonetheless de-energized, thus preventing over heating or burning of the product or fire or other abnormal or dangerous condition. As can be seen in FIGS. 3 and 4, and as reflected in the above discussion, the upward movement of the displacement assembly 4 from its intermediate, toasting position to its up position is entirely independent of the action that de-energizes the heating element(s) C. Thus, even if the displacement assembly 4 cannot move from the intermediate position (FIG. 3) to the up position upon completion of the toasting cycle, the head 24 of the armature 17 nonetheless has sufficient clearance within the actuator recess 9 to move to its disengaged position, away from the solenoid 13 to release the spring contacts 12 (FIG. 4), thereby opening the electrical circuit that energizes the heating elements C.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A toaster for heating consumable products, the toaster comprising:
    a housing defining at least one slot;
    a heating element for heating products in the slot;
    a solenoid;
    a switch for connection to a power source, the switch being electrically connected to the heating element and the solenoid for energizing and de-energizing the heating element and for energizing and de-energizing the solenoid;
    a ferromagnetic armature moveable between an engaged position adjacent to the solenoid and closing the switch and a disengaged position away from the solenoid and opening the switch, the armature having a lateral catch extending therefrom and an inclined surface;
    a biasing member biasing the armature toward the disengaged position;
    a displacement assembly including a product lifter configured to support a consumable product within the slot for heating by the heating element, the displacement assembly being movable from an up position through an intermediate, heating position to a down position and including a lateral catch receiver for receiving the lateral catch when the armature is in the engaged position to thereby retain the displacement assembly in the intermediate, heating position when the displacement assembly moves from the down position toward the up position, the displacement assembly also including an armature actuator which engages the inclined surface of the armature as the displacement assembly moves from the up position to the down position, the interaction of the armature actuator and the inclined surface causing displacement of the armature from the disengaged position to the engaged position to close the switch and energize the heating element and the solenoid for retaining the armature in the engaged position;
    a resilient member for biasing the displacement assembly toward the up position; and
    a timer for de-energizing the solenoid upon completion of heating of the consumable product, the de-energization of the solenoid releasing the armature to return the armature to the disengaged position, thus opening the switch and causing de-energization of the heating element independently of the displacement assembly returning to the up position.

2. The toaster of claim 1 wherein the ferromagnetic armature is pivotably mounted to the housing.

3. The toaster of claim 2 wherein the ferromagnetic armature further includes an actuator tail engaging the housing when the armature is in the disengaged position.

4. The toaster of claim 2 wherein the ferromagnetic armature further includes at least one arm extending therefrom for engaging the switch.

5. The toaster of claim 4 wherein the arm includes an electrical insulator for electrically insulating the armature from the switch.

6. The toaster of claim 1 wherein the timer is selected from the group consisting of an electronic timer, a color sensor, and a thermal actuator.

7. The toaster of claim 1 further including a generally vertically oriented post fixed to the housing, the displacement assembly being slidably positioned on the post for movement between the up and down positions.

8. The toaster of claim 7 wherein the resilient member is a coil spring positioned between the housing and displacement assembly, the post passing generally through the longitudinal center of the coil spring.

9. The toaster of claim 1 wherein the switch includes at least one conductor pin and at least one spring conductor, the conductor pin positioned on the housing, the spring conductor having a first end and an opposing second end, the first end positioned on the housing remote from the conductor pin, the second end aligned with the conductor pin and spaced therefrom such that movement of the armature to the engaged position moves the second end into electrical contact with the conductor pin.

10. The toaster of claim 9 wherein the ferromagnetic armature further includes at least one arm extending therefrom for engaging the switch, the arm including a first end attached to the armature and the second end for engaging the switch.

11. The toaster of claim 1 wherein the displacement assembly extends laterally from the product lifter toward a wall of the housing, the lateral catch receiver being positioned on a distal end of the displacement assembly, the lateral catch receiver including a lateral projection positioned on a lower end of a depending member, the lateral projection directed generally toward the armature actuator and configured to engage the lateral catch on an upper surface of the lateral projection when the armature is in the engaged position.

12. The toaster of claim 11 wherein the displacement assembly includes an actuator recess between the lateral projection and the armature actuator for receiving an upper portion of the armature for permitting the armature to move into the engaged position when the displacement assembly is in its down position, the lateral projection and armature actuator being sufficiently spaced from one another to permit the armature to move away from the engaged position, and thereby open the switch, upon de-energization of the solenoid when the displacement assembly is in the toasting position.

* * * * *